United States Patent [19]
Sands

[11] Patent Number: 5,291,601
[45] Date of Patent: Mar. 1, 1994

[54] SHARED LIBRARIES IMPLEMENTED WITH LINKING PROGRAM LOADER

[75] Inventor: Samuel C. Sands, Fort Collins, Colo.

[73] Assignee: Hewlett-Packard Company, Palo Alto, Calif.

[21] Appl. No.: 860,309

[22] Filed: Mar. 27, 1992

Related U.S. Application Data

[63] Continuation of Ser. No. 359,829, Jun. 1, 1989, abandoned.

[51] Int. Cl.⁵ .............................................. G06F 9/44
[52] U.S. Cl. .............................. 395/700; 364/DIG. 1; 364/245.2; 364/280.4
[58] Field of Search ................................ 395/600, 700

[56] References Cited

U.S. PATENT DOCUMENTS

| | | | |
|---|---|---|---|
| 4,330,822 | 5/1982 | Dodson | 364/200 |
| 4,445,190 | 4/1984 | Pierschalla et al. | 364/900 |
| 4,633,406 | 12/1986 | Katz et al. | 364/200 |
| 4,635,189 | 1/1987 | Kendall | 364/200 |
| 4,809,170 | 2/1989 | Leblang et al. | 364/200 |
| 4,819,160 | 4/1989 | Tanka et al. | 364/300 |
| 4,949,253 | 8/1990 | Chigira et al. | 364/200 |
| 5,136,709 | 8/1992 | Shirakabe et al. | 395/700 |

OTHER PUBLICATIONS

"Pascal 3.2 Workstation Systems Manual," vol. 1: Main Command Level and Subsystems—Hewlett-Packard 9000 Series 200/300 Computers, pp. 2-5, 2-10 and 8-15, Hewlett-Packard Part No. 98615-90023.

Operating Systems: A Systematic View, William S. Davis, Addison-Wesley Publishing Co., 1977, pp.19-26.

Primary Examiner—Gareth D. Shaw
Assistant Examiner—Kakazi Chaki

[57] ABSTRACT

A method and apparatus for running a computer program containing references to a library utilizes a load time linker to insert addresses of referenced library items directly into the program code at run-time. The linking loader causes a delay that is not objectionable to the user. The method includes the steps of maintaining in computer memory a shared library including library items and a library symbol table. A relocatable file representing the computer program is loaded into the computer memory when the computer program is to be run. Addresses of library items that are referenced in the program code are found in the library symbol table, and the addresses of the library items are inserted directly into the program code of the relocatable file in computer memory. After the relocatable file is loaded from disk to memory, all operations are performed in computer memory, resulting in high speed operation. Addresses of library items are preferably found by comparing an alphabetically sorted program symbol table with an alphabetically sorted library symbol table.

4 Claims, 8 Drawing Sheets

202 UNSORTED PROGRAM SYMBOL TABLE

| INDEX | SYMBOL | ADDRESS |
|---|---|---|
| 1 | PRINT | |
| 2 | SORT | |
| 3 | OPEN | |
| 4 | MULTIPLY | |

204 SORTED PROGRAM SYMBOL TABLE

| INDEX | SYMBOL | ADDRESS |
|---|---|---|
| 1 | MULTIPLY | 22 |
| 2 | OPEN | 16 |
| 3 | PRINT | 68 |
| 4 | SORT | 10 |

206 LIBRARY SYMBOL TABLE

| SYMBOL | ADDRESS |
|---|---|
| COMPARE | 45 |
| DUMP | 08 |
| MULTIPLY | 22 |
| OPEN | 16 |
| PRINT | 68 |
| SAVE | 51 |
| SORT | 10 |

208 RELOCATION INFORMATION

| LOCATION OF LIBRARY REFERENCE | INDEX TO SYMBOL TABLE |
|---|---|
| 121 | 3 |
| 140 | 1 |
| 144 | 4 |
| 152 | 2 |
| 162 | 1 |
| 165 | 4 |

FIG 7

202 UNSORTED PROGRAM SYMBOL TABLE

| INDEX | SYMBOL | ADDRESS |
|---|---|---|
| 1 | PRINT | 68 |
| 2 | SORT | 10 |
| 3 | OPEN | 16 |
| 4 | MULTIPLY | 22 |

SHARED LIBRARIES IMPLEMENTED WITH LINKING PROGRAM LOADER

CROSS REFERENCE TO RELATED APPLICATIONS

This is a continuation of copending application Ser. No. 07/359,829 filed on Jun. 1, 1989, now abandoned.

CROSS-REFERENCE TO RELATED APPLICATIONS

The following applications are related to the present application: "Method and Apparatus For Computer Program Encapsulation," Ser. No. 07/358,962 filed May 26, 1989, now U.S. Pat. No. 5,075,847; "Method and Apparatus For Controlling Execution of Tools in A Computer-Aided Software Engineering System," Ser. No. 07/359,912, filed Jun. 1, 1989, now U.S. Pat. No. 5,212,792; and "Method and Apparatus for Communication Between Tools in A computer-Aided Software Engineering System," Ser. No. 07/359,309 filed May 31, 1989, now abandoned.

FIELD OF THE INVENTION

This invention relates to computer programs that utilize shared libraries and, more particularly, to a method and apparatus for linking shared libraries to a program when the program is to be run.

BACKGROUND OF THE INVENTION

Computer programs almost always utilize libraries, including library routines and library data. Library routines are operations that are frequently performed by a different programs. Examples of library routines include operations such as PRINT, SAVE, FILE, MULTIPLY, etc. Library data is data which is utilized by different computer programs. Libraries are utilized by including in the computer program calls to library routines and/or library data. Libraries permit the programmer to take advantage of previously-developed routines. Furthermore, changes or improvements to libraries can be implemented by changing one library rather than multiple computer programs.

As used herein, the term "library items" refers collectively to library routines and library data. In prior art systems, when several programs were run on a computer system, it was customary for each program to have its own copy of referenced library items. However, 50 percent or more of a program may be attributable to library items. Thus, when a private copy of the library items is attached to several concurrently running programs, a large memory space may be required.

To alleviate the memory space problem associated with multiple copies of libraries, shared libraries have been utilized. A single copy of the library is shared by all programs that are being run concurrently. Each user program, rather than including copies of the library items, contains pointers to the library items that are used. With only one copy of the library in memory, memory requirements are considerably reduced.

The conventional linking process involves replacing symbolic library references with absolute addresses and creating a disk file containing the executable code. In the past, it was considered impractical to perform linking of libraries to programs at run time since the conventional linking process takes several minutes and would delay the user. Techniques have been developed to speed up the process of linking programs to shared libraries. These techniques usually involve partial linking of the program when it is loaded into memory and completion of linking when the program is run.

According to one known technique, a jump table is associated with the program. The jump table contains the addresses of the library routines that are referenced by the program. A pointer to the appropriate location in the jump table is placed in each library reference in the program. The jump table includes a jump instruction to the corresponding address of the library routine. When the program is loaded, the addresses of library routines are filled in the jump table. When the program is run, each library reference causes a reference to the jump table which in turn executes a jump instruction to the library routine. The disadvantage of this technique is that one or more additional instructions are executed for each library subroutine call, thereby slowing run-time operation of the program. Furthermore, jump tables cannot be used for references to library data. Indirection tables have been utilized for references to library data. However, indirection tables also require execution of additional instructions at run time and degrade run-time performance.

It is a general object of the present invention to provide an improved method for utilizing shared libraries.

It is a further object of the present invention to provide a method for utilizing shared libraries which does not adversely affect run-time performance.

It is yet another object of the present invention to provide a method for utilizing shared libraries in which libraries are rapidly linked to computer programs at run time.

It is still another object of the present invention to provide a method for utilizing shared libraries which does not require modification of the operating system, the compiler or the assembler.

SUMMARY OF THE INVENTION

According to the present invention, these and other objects and advantages are achieved in a method and apparatus for running a computer program containing references to a library. The method of the present invention utilizes a load-time linker to insert referenced library addresses directly into the program code at run-time. Partial linking, jump tables and indirection tables are not required. As a result, no additional instructions are incorporated into the program, and run-time performance is not degraded. Furthermore, there are no modifications to the operating system, to the compiler, to the computer program or to the library in order to implement the method of the present invention. The linking loader operates in a time that is not objectionable to the user.

The present invention provides a method for running a computer program which contains references to a library. The method comprises the steps of maintaining in computer memory a shared library including library items and a library symbol table. The library items includes library routines and library data. A relocatable file representing the computer program is loaded into the computer memory when the computer program is to be run. The relocatable file includes program code having references to library items. Addresses of library items that are referenced in the relocatable file are found in the library symbol table, and the addresses of the library items are inserted directly into the program code of the relocatable file in computer memory. The computer program is then ready for execution. Once the relocatable file has been loaded from disk to memory, all operations are performed in computer memory, resulting in high speed operation.

The relocatable file includes an unsorted program symbol table containing symbols that represent library items referenced by the program code and relocation information containing locations in the program code of references to library items and indices of corresponding symbols in the unsorted program symbol table. The step of finding addresses of library items includes the step of finding in the library symbol table symbols that appear in the unsorted program symbol table and copying addresses from the library symbol table into the unsorted program symbol table. The step of inserting the addresses of referenced library items into the relocatable file includes the steps of accessing each program location contained in the relocation information, finding the corresponding address of the referenced library item in the unsorted program symbol table and writing the corresponding address of the referenced library item in the accessed program location.

In a preferred method of finding symbols that appear in the unsorted program symbol table, the library symbol table is maintained in a predetermined order, such as alphabetical. The unsorted program symbol table is sorted into the predetermined order to provide a sorted program symbol table. A first symbol in the sorted program symbol table is compared with each symbol in the library symbol table in accordance with the predetermined order until a match is found. When a match is found, the address of the referenced library item is copied from the library symbol table into the sorted program symbol table. Then, the next symbol in the sorted program symbol table is compared with each symbol in the library symbol table starting with the entry in the library symbol table immediately following the previous entry where a match was found. When a match is found, the address of the referenced library item is copied from the library symbol table into the sorted program symbol table. The process is repeated until all symbols in the sorted program symbol table have been found. The above-described method utilizing a sorted library symbol table and a sorted program symbol table provides high speed operation, since it is necessary to go through the library symbol table only once in order to find all symbols contained in the sorted program symbol table. Finally, addresses of referenced library items are copied from the sorted program table into the corresponding symbol locations in the unsorted program symbol table. Then, the addresses are inserted in the computer program locations as described above.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
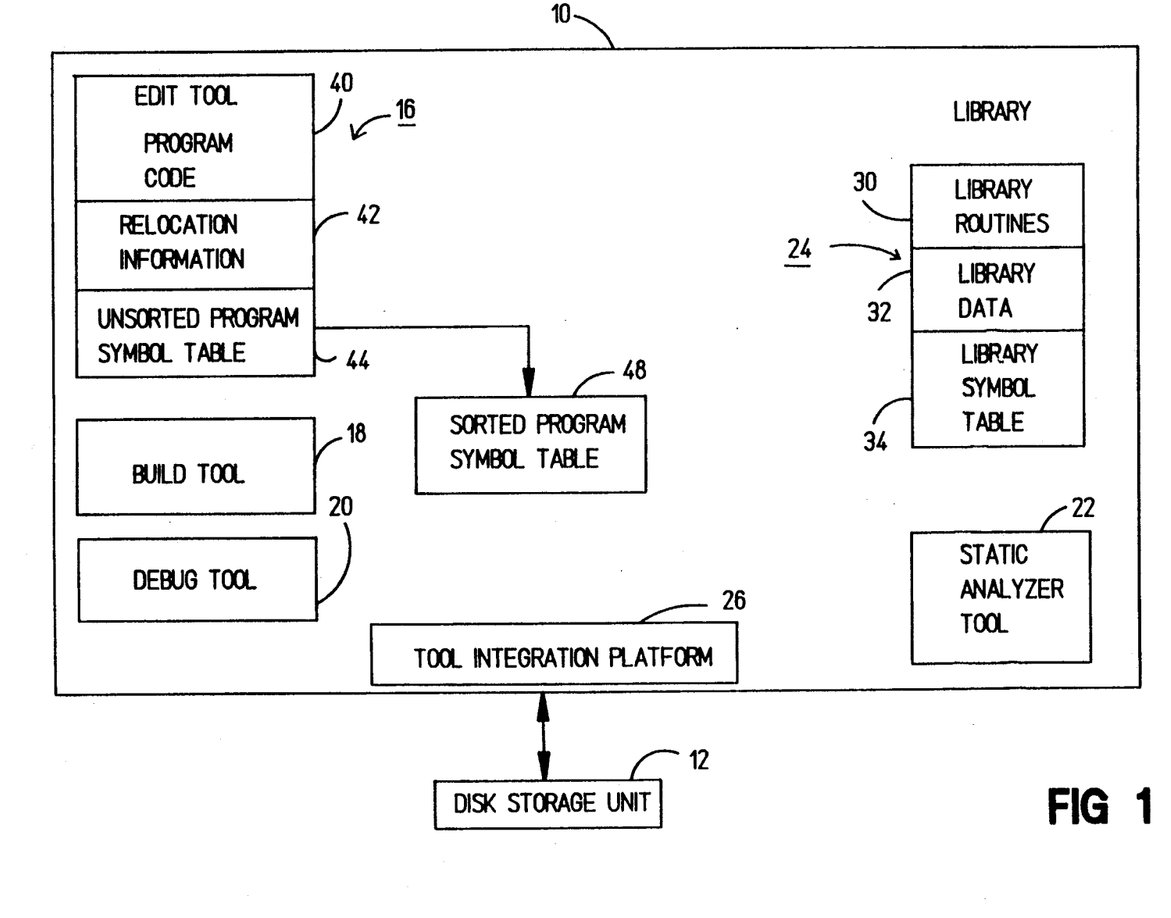
FIG. 1 is a simplified block diagram of a computer system illustrating the program structure in accordance with the present invention.

A computer environment suitable for use of the present invention is illustrated in FIG. 1. A computer 10 includes a central processing unit and main memory and is connected to a disk storage unit 12. The computer system has the capability of running several programs concurrently. Computer programs 16, 18, 20 and 22 run concurrently, and each of the programs contain references to a library 24. At different times, different programs are loaded from disk storage unit 12 into the memory of computer 10 and are run as desired by the user.

An example of a system of the type shown in FIG. 1 is a computer-aided software engineering (CASE) system. Computer-aided software engineering systems have been developed to assist computer programmers in the construction, test and maintenance of complex computer software. In a preferred system, program 16 is an edit tool, program 18 is a build tool, program 20 is a debug tool and program 22 is a static analyzer tool. The tools are controlled and integrated by an operating system known as a tool integration platform 26. The tool integration platform 26 performs the functions of communication between tools, work area management, distributed tool execution and user interface management.

The CASE system supports program development by multiple users in a distributed computing environment. Thus, tools can be run on a local host computer or a remote host computer. The CASE system of the present example can be run on a Series 300 or a Series 800 workstation manufactured by Hewlett-Packard Company. Typical hardware requirements on either workstation include 8 or 16 megabytes RAM, a high resolution display, keyboard and mouse, and a 150 or 300 megabyte disk. The CASE system is run with the HP-UX operating system and XII Windows, a program for support of window-based operation. Multiple workstations can be interconnected via a local area network to provide a distributed computing environment. The above example is intended to illustrate a computer environment suitable for use of the present invention. However, the present invention is not limited to use with particular computer hardware or software.

Referring again to FIG. 1, the library 24 contains library routines 30, library data 32 and a library symbol table 34. The library routines 30 comprise code for routines that are commonly used by several or all of the programs in the system. Similarly, the library data 32 contains data that is used by some or all of the programs in the system. The library symbol table 34 contains a list of symbols which are used to represent the various library routines and library data and the corresponding entry address for each of the library routines and library data. The symbols are used by the programs 16, 18, 20, 22 to call library routines and library data.

The library 24 is shared by the programs 16, 18, 20, 22 and any other programs which may be run on computer 10. Only one copy of the library 24 is maintained in memory. Thus, less memory space is required than in the case where copies of the library are attached to each program.

The relevant components of program 16 include program code 40, relocation information 42 and an unsorted program symbol table 44. The programs 18, 20 and 22 have the same components. The program code 40 includes the instructions for performing program operations. The program code may include calls to library routines 30 and references to library data 32. The library calls are in the form of instructions in which the operand is a symbol that represents the library routine to be called or the library data to be referenced. The relocation information includes a list of locations in the program code 40 that contain references to the library 24. The relocation information also includes for each program code location, an index to symbol table 44. The symbol table 44 includes a list of symbols representing those of the library routines and library data which are referenced by the program code and corresponding addresses of the library routines and library data. When the program 16 is initially loaded from disk storage unit 12 into memory, the symbol table 44 contains no library addresses.

The method for running a computer program in accordance with the present invention will now be described. Assume that programs 18, 20 and 22 are running on computer 10 and it is desired to initiate operation of program 16. As a preliminary step prior to running any of the programs 18, 20 and 22, the library 24 was loaded from disk storage unit 12 into the main memory of computer 10. The library 24 is maintained in memory from initial startup until shutdown or rebooting of the computer. For reasons described hereinafter, the library symbol table 34 is preferably sorted alphabetically at the time the library 24 is loaded from disk storage unit 12 into the memory of computer 10.

Figure 2:
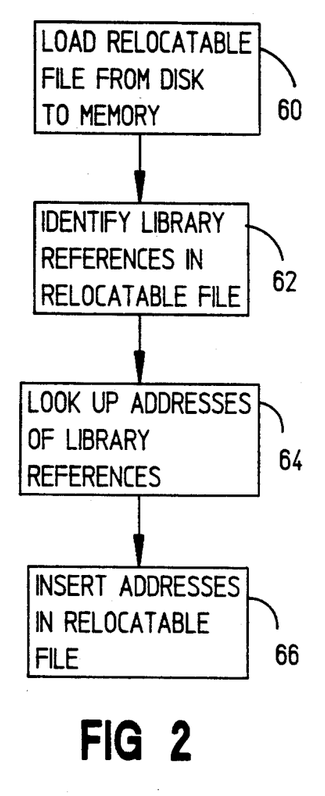
FIG. 2 is a simplified flow diagram illustrating the method of the present invention.

The program 16 is stored on disk storage unit 12 as a relocatable file wherein references to library routines 30 and library data 32 appear in program code 40 as symbols rather than addresses or pointers to the library. When the user invokes program 16, the relocatable file is loaded from disk storage unit 12 into the memory of computer 10, as indicated in step 60 of FIG. 2. Next, the references or calls to the library 24 that are contained in the program code 40 of the relocatable file are identified, as indicated in step 62. In step 64, the addresses of the library references are looked up in the library symbol table 34. Finally, in step 66, the addresses are inserted directly into the program code 40 of the relocatable file, thereby providing an executable program which is ready to run. Significantly, the library addresses are inserted directly into the program code without requiring the use of jump tables or indirection tables. Thus, instructions are not added to the program, and run-time performance is not affected. The loading and linking process is completed in a time which is not objectionable to the user.

Figure 3A:
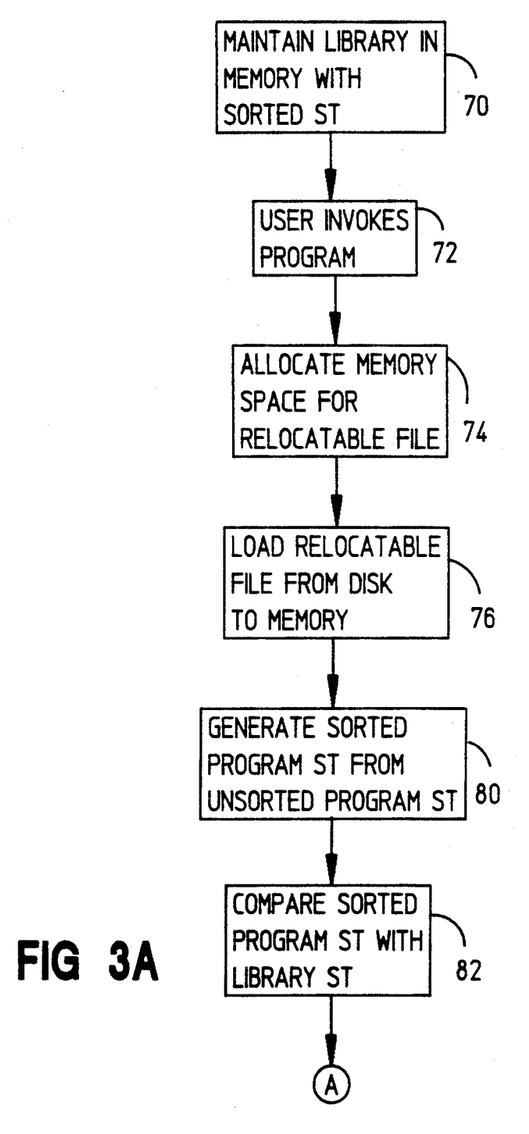
FIGS. 3A and 3B are flow diagrams illustrating the method of the present invention in more detail.
Figure 3B:
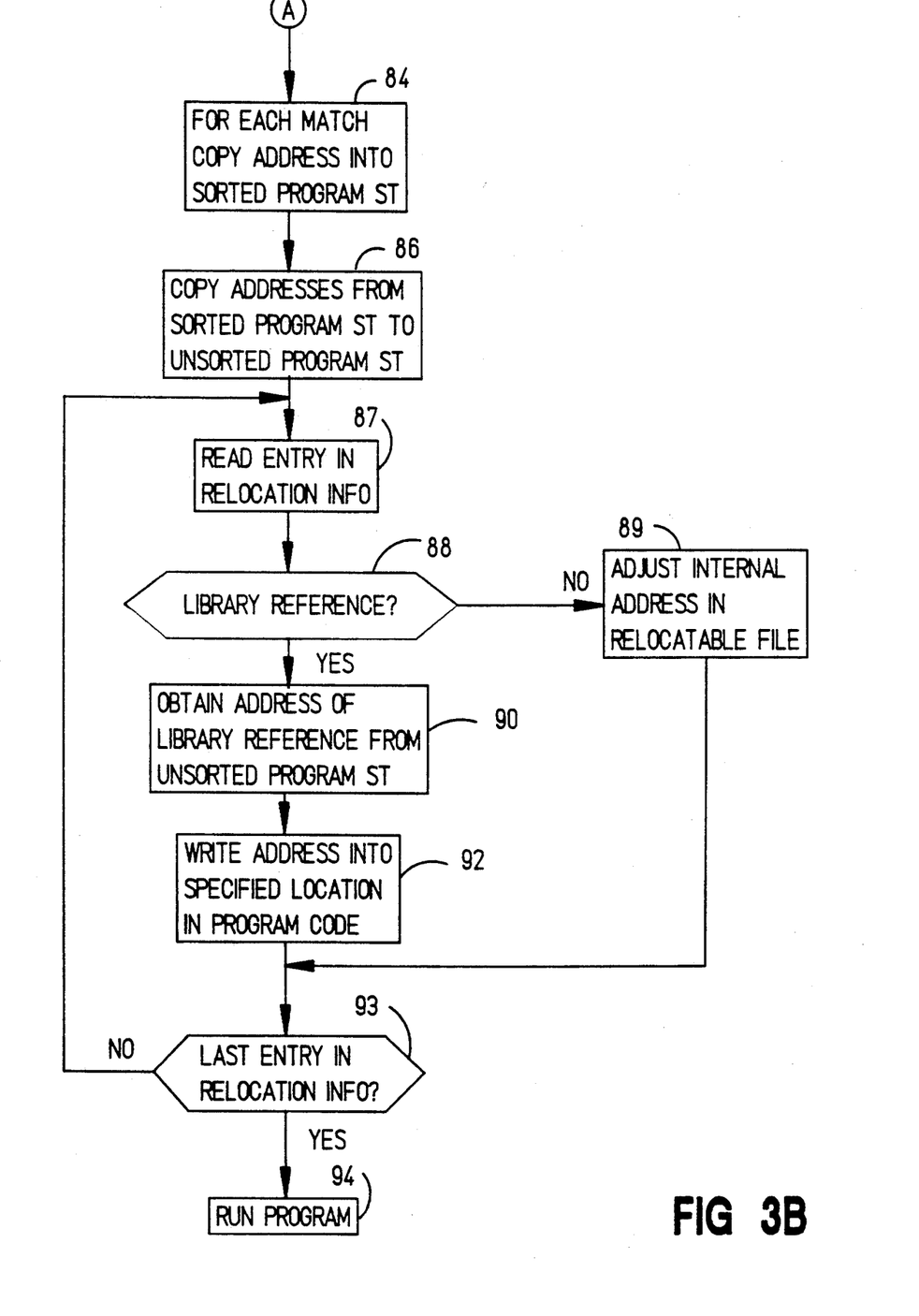

A more detailed flow diagram of the method of the present invention is shown in FIGS. 3A and 3B. The library 24 is maintained in memory with a sorted library symbol table, as indicated by step 70. When the user invokes a program (step 72), memory space for the program is allocated (step 74) and the relocatable file representing the desired program is loaded from the disk storage unit 12 into the computer memory in step 76. Then, the unsorted program symbol table 44 in the relocatable file is used to generate a sorted program symbol table 48 in step 80. Preferably the sorted program symbol table 48 is in alphabetical order of the listed symbols.

Next, the sorted program symbol table 48 is compared with the library symbol table in step 82. When matches are found, the address of the library item corresponding to the symbol is copied from the library symbol table into the sorted program symbol table 48 in step 84. Typically, the library symbol table 34 contains more entries than the program symbol table, since all library routines and library data are not usually used by the program. An advantageous technique for comparing the sorted program symbol table 48 with library symbol table 34 is described hereinafter with reference to FIG. 4. Next, the addresses that were copied into the sorted program symbol table 48 are recopied into the unsorted program symbol table 44 in step 86. The correspondence between entries in the sorted and unsorted program symbol tables was saved during the sorting process and is used to cross-reference entries in the two tables.

Now the unsorted program symbol table 44 contains addresses of all library routines and library data that are called by the program code. As indicated above, the relocation information 42 in the program includes program locations of library references and corresponding indices to the unsorted program symbol table 44. In addition, the relocation information 42 includes program locations of internal addresses that must be adjusted to reflect actual addresses in memory. In step 87, an entry in relocation information 42 is read. The entry is identified in step 88 as pertaining either to a library reference or to an internal address that must be adjusted. If the relocation information entry contains an internal address, the internal address in the program code is adjusted in step 89 to reflect the actual address. If the entry in the relocation information contains a library reference, the index included in the relocation information is used in step 90 to obtain the address of the library reference from the unsorted program symbol table 44. In step 92, the address is written into the specified location in the program code 40. Then, a check is made in step 93 to determine if there are additional entries in the relocation information 42. If the just-completed entry was not the last entry in the relocation information, steps 87-93 are repeated, as required. After all entries in the relocation information have been processed, addresses of library references have been written into the program code 40 and internal addresses have been adjusted to effect relocation of the program, the program is in executable form and can be run in step 94.

Figure 4:
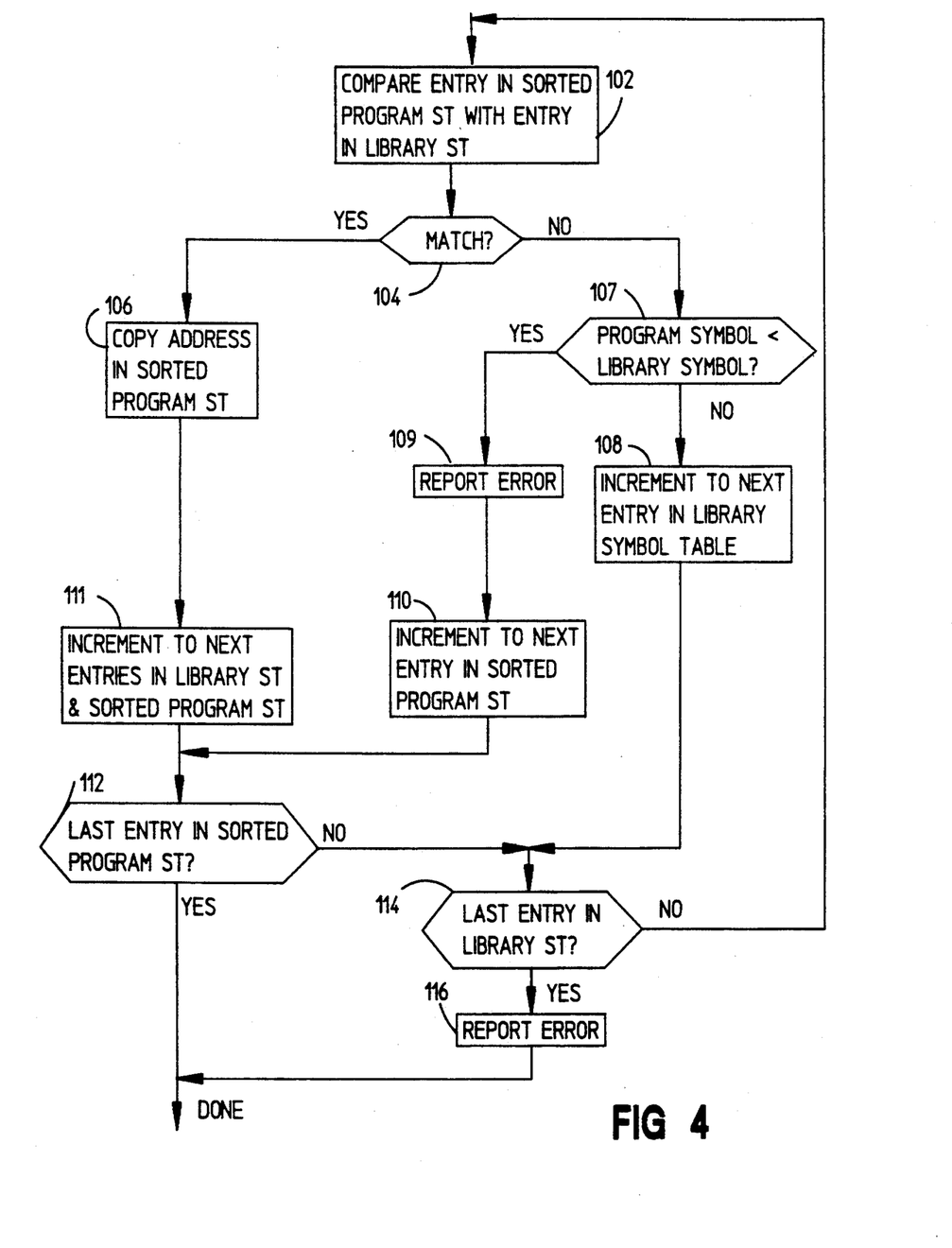
FIG. 4 is a flow diagram illustrating a preferred method for finding addresses of library items referenced in the computer program.

A preferred method for comparing the program symbol table with the library symbol table and copying addresses into the program symbol table is shown in FIG. 4. As indicated above, the library symbol table 34 is maintained in alphabetical order, and the alphabetically sorted program symbol table 48 is generated from the unsorted program symbol table 44. While alphabetical sorting is preferred, another predetermined order can be utilized, provided that the library symbol table and the sorted program symbol table have the same predetermined order. The first entry in the sorted program symbol table 48 is compared with the first entry in the library symbol table 34 in step 102. If a match occurs, as indicated in step 104, the address of the library item is copied from the library symbol table to the sorted program symbol table in step 106. If a match does not occur in step 104, the program symbol value is compared with the library symbol value in step 107. If the program symbol value is greater than the library symbol value, the routine increments in step 108 to the next entry in the library symbol table. The library symbol table is then checked in step 114 for additional entries. The case where there are no additional entries is discussed below. If there are additional entries in the library symbol table, the comparison is repeated in step 102. The routine steps through entries in the library symbol table until a match with the first entry in the sorted program symbol table is found.

The reason for comparing the program symbol value with the library symbol value in step 10 is to determine whether the point in the alphabetically sorted library symbol table where the program symbol should have been found has been passed. If this occurs, the program symbol is not in the library symbol table, and an error is reported to the operating system. Referring again to FIG. 4, when the program symbol value is less than the library symbol value in step 107, an error is reported in step 109. Then, the routine increments in step 110 to the next entry in the sorted program symbol table.

After copying the address from the library symbol table to the sorted program symbol table in step 106, the routine increments in step 111 to the next entry in the sorted program symbol table. The library symbol table is also incremented to the entry immediately following the entry for which a match was previously found. If there are no more entries in the sorted program symbol table (step 112), the comparison is complete. If there are additional entries in the sorted program symbol table, the library symbol table is checked in step 114 for additional entries. If there are additional entries in the library symbol table, the above process is repeated for each entry in the sorted program symbol table. If step 114 determines that there are no more entries in the library symbol table, an error is reported to the operating system in step 116. This indicates that the library symbol table has been fully traversed, and one or more entries in the sorted program symbol table have not been found. Steps 107 and 114 serve the purpose of determining when library references contained in the program do not appear in the library symbol table. When this occurs, an error is reported, as indicated above, and the program must be aborted.

In some cases, a computer system may contain more than one library. When this occurs, the process shown in FIG. 4 and described hereinabove is repeated for each library. Library references in the sorted program symbol table are searched in each library symbol table until all library references have been found. If one or more library references is not found in any of the libraries, an error is reported to the operating system.

The alphabetical ordering of the program symbol table and the library symbol table permits the addresses of all library items contained in the program symbol table to be found in one search through each table. The process can be thought of as simultaneously walking through both tables in parallel to find matching entries. It will be understood that the comparison of the program symbol table with the library symbol table can be performed without alphabetical sorting of the tables. However, with unsorted tables, it would necessary to search the library symbol table repeatedly for each entry in the program symbol table.

Figure 5:
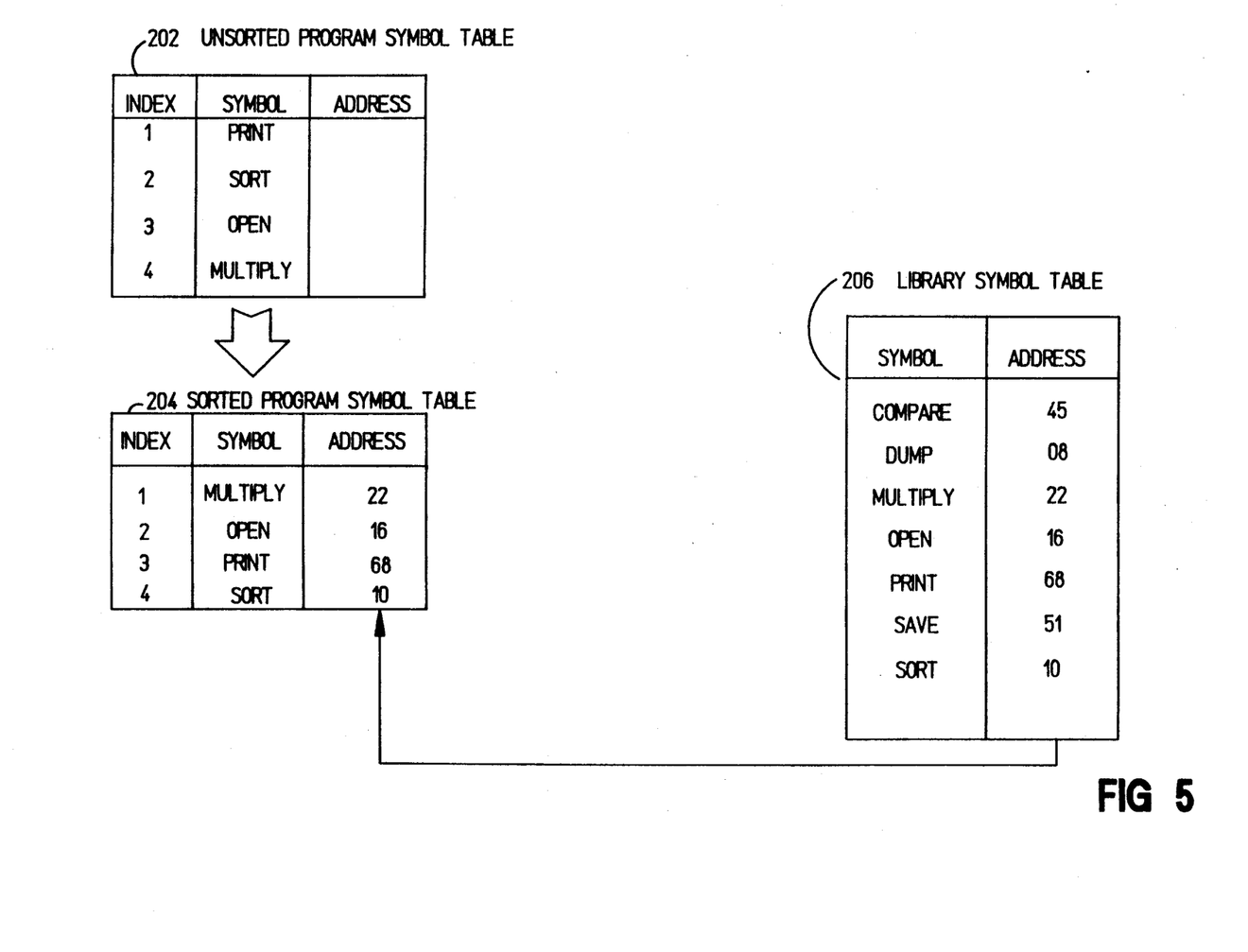
FIGS. 5-9 illustrate an example of the present invention.

An example of the method of the present invention will now be described with reference to FIGS. 5-9. The example is simplified for illustrative purposes and is not intended to depict an actual program. Referring to FIG. 8, there is shown a segment of program code 40 showing calls to library routines at program locations 121, 140, 144, 152, 162 and 165. The program instructions at these locations contain calls to library routines including OPEN, PRINT, MULTIPLY and SORT. Library data can be referenced in the same manner. Between the instructions shown are other instructions which do not contain library calls. An unsorted program symbol table 202 that corresponds to the program segment of FIG. 8 is illustrated in FIG. 5. The unsorted program symbol table 202 contains an entry for each different symbolic reference to a library item. When the program is initially loaded from the disk storage unit 12 into memory, the table 202 contains no addresses of library items.

Next, the unsorted program symbol table 202 is used to generate a sorted program symbol table 204 in which the symbols are arranged alphabetically. At this time, the sorted program symbol table 204 contains no addresses. The sorted program symbol table 204 is then compared with library symbol table 206. The library symbol table 206 contains all of the symbols that are referenced by the program and additional symbols corresponding to library items that the program does not use. The library symbol table 206 contains an address for each symbol. The address is a pointer to the entry point of the library routine or library data corresponding to the symbol. Thus, for example, the MULTIPLY library routine starts at address 22 in the library routines.

Next, the alphabetically sorted program symbol table 204 is compared with alphabetically sorted library symbol table 206 as follows. The first entry in table 204, MULTIPLY, is compared with the first item in table 206, COMPARE. Since the entries do not match, the comparison is repeated for the first entry in the table 204 and the second entry in table 206. Again, no match occurs. When the first entry in table 204 is compared with the third entry in table 206, MULTIPLY, a match occurs and the address 22 from library symbol table 206 is copied into the first entry in table 204. Now the second entry in sorted program symbol table 204, OPEN, is compared with the entry in table 206 which immediately follows the entry where a match was previously found. Thus, the second entry in table 204 is compared with the fourth entry in table 206. Since a match occurs, the address 16 from table 206 is copied into the second entry in table 204. The process is repeated in the same manner until all entries in table 204 have been found in table 206 and the corresponding addresses have been copied into table 204. It is noted that the sorted program symbol table 204 and the library symbol table 206 are each searched only once.

Figure 6:
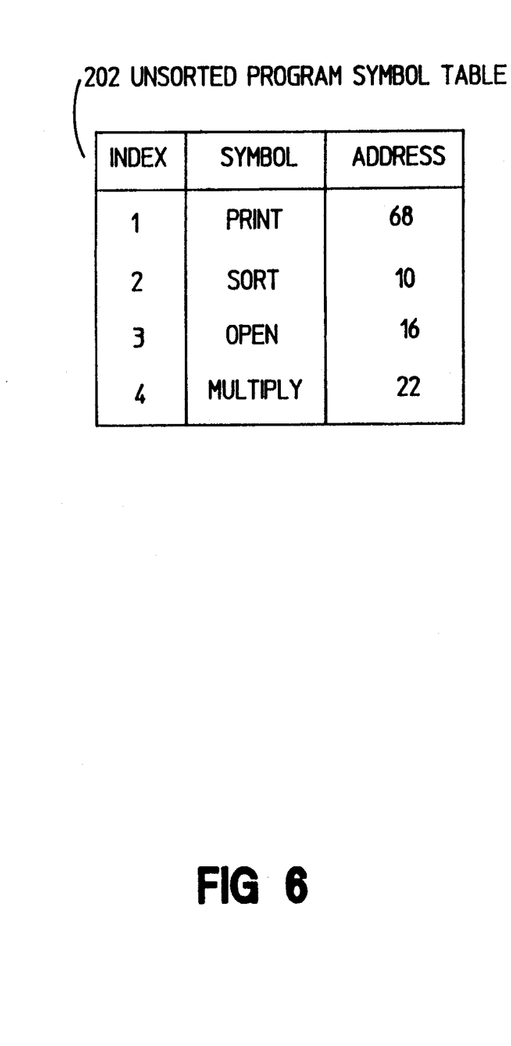

When sorted program symbol table 204 was generated from unsorted program symbol table 202, the correspondence between entries was retained for later use. Thus, for example, the first entry in table 202 corresponds to the third entry in table 204, the second entry in table 202 corresponds to the fourth entry in table 204, etc. The correspondence between tables 202 and 204 is utilized to copy addresses from table 204 into the unsorted program symbol table 202, as shown in FIG. 6. Thus, the unsorted program symbol table 202 which was stored on disk and initially contained no addresses has been provided with addresses of corresponding library routines and library data.

Figure 7:
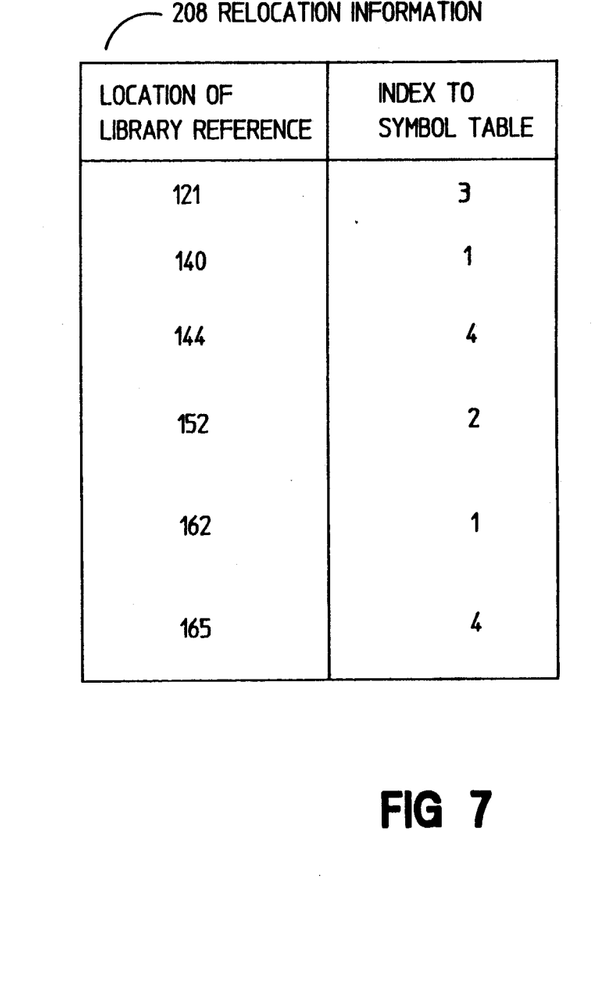
Figure 8:
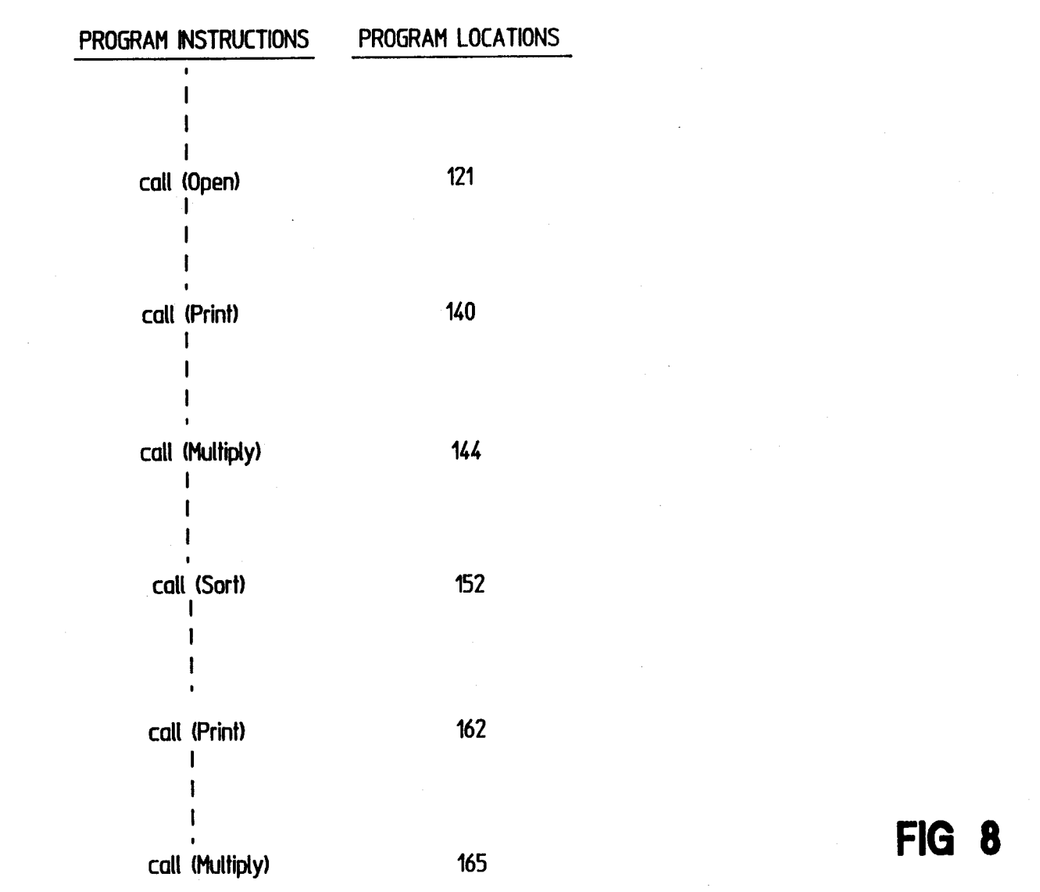

Relocation information 208 contained in the computer program is illustrated in FIG. 7. The relocation information 208 includes locations of library references and corresponding indices to the unsorted program symbol table 202. The program locations 121, 140, 144, 152, 162 and 165 that have calls to library routines as shown in FIG. 8 are listed in the relocation information. Each entry contains an index to the symbol table 202. Thus, the first entry contains location 121 and index 3. Referring to FIG. 6, table 202, index 3, contains the symbol OPEN and the address 16 of the library routine OPEN. Similarly, the second entry in relocation information 208 contains location 140 and index 1. Index 1 in table 202 contains the symbol PRINT and the address 68 of the library routine for PRINT.

Figure 9:
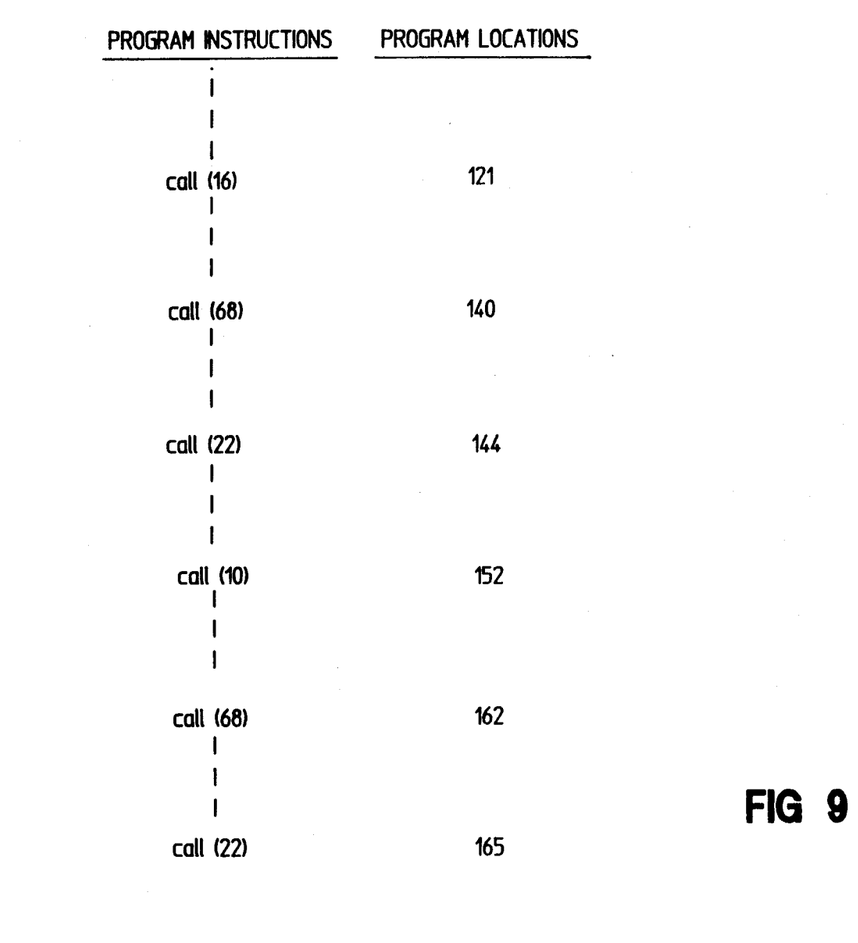

The relocation information 208 is utilized to replace the symbolic library references in the program code with the actual addresses of the referenced library routines and library data. The first entry in the relocation information contains location 121 and index 3 in table 202. The address 16 from index 3 of table 202 is inserted in the operand of the instruction at location 121 as indicated in FIG. 9. The second entry in the relocation information 208 contains location 140 and index 1 in table 202. The address 68 from index 1 of table 202 is inserted in the operand of the instruction at location 140. The procedure is repeated for all entries in the relocation information 208, resulting in the program segment shown in FIG. 9. After all symbolic library references have been replaced with addresses of library routines and library data, the program is ready for execution.

The relocatable file representing the computer program has been converted into executable form without the addition of instructions and without the use of jump tables and indirection tables. The program is loaded, linked and run with a delay which is not objectionable to the user. For a program length of 40 kilobytes, the delay in loading and linking of the program in accordance with the present invention is on the order of about one second. For large programs, the delay is somewhat longer but is tolerable to the user. Since no modifications have been made to the program, run-time performance is not degraded. However, the memory saving associated with shared libraries is achieved.

While there have been shown and described what are at present considered the preferred embodiments of the present invention, it will be obvious to those skilled in the art that various changes and modifications may be made therein without departing from the scope of the invention as defined by the appended claims.

What is claimed is:

1. In a computer system comprising an electronic digital computer including a central processing unit, a computer memory and a disk storage unit, and computer software including one or more computer programs for operating said computer, a method for utilizing a library in said one or more computer programs, comprising the steps of:

said computer system maintaining in said computer memory a library, including library items and a library symbol table, said library items including executable library routines, each entry in the library symbol table containing a symbol that represents one of the library items and an address of said one of the library items;

said computer system, in response to a computer program being invoked by a user for execution, loading from said disk storage unit into said computer memory a relocatable file representing the invoked computer program, said relocatable file including program code having one or more symbols, each of which references one of said library routines;

said computer system, after the relocatable file is loaded into said computer memory, finding in the library symbol table addresses of library routines that are referenced by symbols in the program code of the invoked computer program; and said computer system inserting the addresses of the referenced library routines into the program code of the relocatable file in said computer memory such that the invoked computer program is ready for execution and such that said executable library routines remain unmodified during execution of the invoked computer program and are available for use by other computer programs in said computer system, said relocatable file including an unsorted program symbol table containing symbols and corresponding indices that represent library routines referenced by the program code and further including relocation information containing program locations in the program code of references to library routines and indices of corresponding symbols in the unsorted program symbol table, wherein the step of finding addresses of library routines includes the steps of finding in the library symbol table symbols that appear in the unsorted program symbol table, each of said symbols having an address of a library routine listed therewith in the library symbol table, and writing the addresses of the library routines corresponding to said symbols in the unsorted program symbol table and wherein the step of inserting the addresses of referenced library routines into the program code includes the steps of accessing each program location contained in the relocation information, using the indices in the relocation information to find the corresponding address of a referenced library routine in the unsorted program symbol table and writing the corresponding address of the referenced library routine contained in the unsorted program symbol table in the accessed program location.

2. A method for utilizing a library as defined in claim 1 wherein the step of maintaining a library includes the step of maintaining the library symbol table in a predetermined order and wherein the step of finding in the library symbol table symbols that appear in the unsorted program symbol table includes the steps of sorting the unsorted program symbol table into said predetermined order to provide a sorted program symbol table and using the sorted program symbol table to find addresses of library routines in the library symbol table.

3. A method of utilizing a library as defined in claim 2 wherein the step of finding symbols that appear in the unsorted program symbol table includes the steps of comparing a first symbol in the sorted program symbol table with each symbol in the library symbol table in accordance with said predetermined order until a match is found, when a match is found, copying the address of the referenced library routine from the library symbol table into the sorted program symbol table, advancing to a next symbol in the sorted program symbol table in accordance with said predetermined order, in accordance with said predetermined order, comparing the next symbol in the sorted program symbol table with each symbol in the library symbol table starting with the entry in the library symbol table immediately following the entry where a match was previously found, when a match is found, copying the address of the referenced library routine from the library symbol table into the sorted program symbol table, repeating the three previously-mentioned steps until all symbols in the sorted program symbol table have been found and addresses have been copied from the library symbol table into the sorted program symbol table, and copying addresses of referenced library routines from the sorted program symbol table into the unsorted program symbol table.

4. In a computer system comprising an electronic digital computer including a central processing unit, a computer memory and a disk storage unit, and computer software including at least two computer programs for operating said computer, a method for utilizing a library in said two or more computer programs, comprising the steps of:

said computer system maintaining in said computer memory a library, including library items and a library symbol table, said library items including executable library routines, each entry in the library symbol table containing a symbol that represents one of the library items and an address of said one of the library items;

said computer system, in response to a first computer program being invoked by a user for execution, loading from said disk storage unit into said computer memory a first relocatable file representing the first computer program, said first relocatable file including program code having one or more symbols, each of which references one of said library routines;

said computer system, after the first relocatable file is loaded into said computer memory, finding in the library symbol table addresses of library routines that are referenced by symbols in the program code of the first computer program;

said computer system inserting the addresses of the referenced library routines into the program code of the first relocatable file in said computer memory such that the first computer program is ready for execution;

said computer system, in response to a second computer program being invoked by a user for execution, loading from said disk storage unit into said computer memory a second relocatable file representing the second computer program, said second relocatable file including program code having one or more symbols, each of which references one of said library routines;

said computer system, after the second relocatable file is loaded into said computer memory, finding in the library symbol table addresses of library routines that are referenced by symbols in the program code of the second computer program; and said computer system inserting the addresses of the referenced library routines into the program code of the second relocatable file in said computer memory such that the second computer program is ready for execution and such that said executable library routines remain unmodified during execution of the first computer program and the second computer program so that only one copy of the executable library routines is required in said computer memory, said relocatable files each including an unsorted program symbol table containing symbols and corresponding indices that represent library routines referenced by the program code and further including relocation information containing program locations in the program code of references to library routines and indices of corresponding symbols in the unsorted program symbol table, wherein the steps of finding addresses of library routines each includes the steps of finding in the library symbol table symbols that appear in the unsorted program symbol table, each of said symbols having an address of a library routine listed therewith in the library symbol table, and writing the addresses of the library routines corresponding to said symbols in the unsorted program symbol table and wherein the steps of inserting the addresses of referenced library routines into the program code each includes the steps of accessing each program location contained in the relocation information, using the indices in the relocation information to find the corresponding address of a referenced library routine in the unsorted program symbol table and writing the corresponding address of the referenced library routine contained in the unsorted program symbol table in the accessed program location.

* * * * *